United States Patent [19]

Adams et al.

[11] 4,044,286

[45] Aug. 23, 1977

[54] CONTROL CIRCUIT FOR HOSPITAL BED

[75] Inventors: James S. Adams, Batesville; Charles W. Cutler, Indianapilis, both of Ind.

[73] Assignee: Hill-Rom Company, Inc., Batesville, Ind.

[21] Appl. No.: 699,069

[22] Filed: June 23, 1976

[51] Int. Cl.[2] .................................................. H02P 1/00

[52] U.S. Cl. ........................................ 318/297; 318/54; 318/65; 318/103; 318/523; 5/66; 5/68

[58] Field of Search .................. 5/66, 68; 318/54, 65, 318/103, 296, 297, 300, 523, 525, 532, 51; 307/113, 115

[56] References Cited

U.S. PATENT DOCUMENTS

| | | | |
|---|---|---|---|
| 3,302,090 | 1/1967 | Rayfield | 318/297 |
| 3,644,945 | 2/1972 | Goodman et al. | 5/68 |
| 3,716,876 | 2/1973 | Petzon et al. | 5/68 |
| 3,728,606 | 4/1973 | Finnegan et al. | 318/54 |
| 3,913,153 | 10/1975 | Adams et al. | 5/68 |

*Primary Examiner*—Robert K. Schaefer
*Assistant Examiner*—Michael K. Mutter
*Attorney, Agent, or Firm*—Haight, Hofeldt, Davis & Jambor

[57] ABSTRACT

Beds, such as hospital beds, in which at least some portion of the bed is movably actuated by an electric motor (or motors) are provided with a control circuit to determine proper energization of the motor from an AC power source. Since the AC signal from the power source could be harmful to the person selecting a desired direction of travel of the movable portion of the bed, the selecting portion of the control circuit is isolated by appropriate transformers from the power portion that supplies the motor. Bidirectional switching devices, such as triacs, are utilized to convey the power to the motor. Other bidirectional switching devices, such as triacs, are used to gate the power handling triacs through appropriate gating transformers. A phase shifting arrangement is utilized in connection with the gating transformers to provide proper commutation of the power handling triacs. Supplemental features, such as additional locations of the control and limit switches to establish maximum distance of travel may be employed. When both head and knee movable portions are utilized, a contour circuit may be employed to automatically adjust the knee portion upon variation of the head portion, within certain limits of travel. A disconnect arrangement employing a self-gating triac is utilized to automatically open a hot line to the common of one of the motors unless the energizing circuit for that motor is completed.

15 Claims, 2 Drawing Figures

CONTROL CIRCUIT FOR HOSPITAL BED

BACKGROUND OF THE INVENTION

1. Field of the Invention

This invention relates generally to a control circuit for beds having movable portions actuated by an electric motor, and more specifically, this invention relates to a control circuit for hospital beds in which electric motors are energized by full wave AC power signals to adjust movable portions of the hospital bed.

2. Description of the Prior Art

In some types of beds, especially those used by people who are bedridden for periods of time, such as hospital beds, it is desirable to be able to adjustably position the heighth of the bed. In addition, it is desirable to be able to adjustably position the angle of the patient's upper torso, and to adjustably position the knee support of the bed. Various type of adjustable bed arrangements have been utilized in the past, and more recently electric motors have been utilized to provide the driving force for positioning the bed portions.

One of the big advantages of electric motor drive is that it permits control by the patient of the positioning of the various bed portions. Thus, the patient can adjust the bed for his own comfort without having to call a nurse or exert undesired activity in mechanically adjusting the bed portions.

However, is such patient control is provided by a simple switch in the motor circuit, under some circumstances the patient could be exposed to dangerous electrical current levels, especially as the patient would normally be in a somewhat weakened state. Therefore, it is necessary to limit the exposure of the patient to electrical currents, both during normal operation and in the event of a fault or failure. One way to accomplish this is to utilize a separate low power source for the patient selecting circuit. The provision of such a supplemental power source creates many difficulties of its own. For example, if a battery is utilized, it means that the battery must be replaced at periodic intervals, with the attendant cost and maintenance problems. Accordingly, it is much more desirable to be able to utilize the available 120 volt AC power, which is also used to drive the motors, for the selecting function.

While some types of such systems have been developed in the past, some quite successful, they have generally been relatively complicated in order to obtain the desired isolation between the selecting and power portions of the system, and hence relatively expensive and more prone to failure.

SUMMARY OF THE INVENTION

The present invention provides a control circuit for a bed, such as a hospital bed, having at least one movable portion driven by an electric motor. Energization of the motor is controlled by bidirectional power switches, such as triacs, which permit full wave AC (alternating current) power transfer. (The term triac is derived from triode AC, and the triac is a semiconductor device which may be triggered for current conduction in both directions therethrough.)

A pair of field windings are associated with the driving motor to control the direction in which the movable portion of the bed is driven. Each of the field windings has a power triac connected thereto. AC power for the motor is connected to the power triacs from a suitable source. Gating of the triacs (i.e., actuation of the bidirectional power switches), is achieved by means of gating transformers.

Each of the primary windings of the gating transformers is energized from the secondary winding of a power transformer. The primary winding of the power transformer is connected to the source of AC power, while the secondary winding has one side thereof grounded, with the core of the power transformer also being grounded. By means of the power transformer and the gating transformers, the portion of the control circuit providing power to the motors is separated from the portion of the circuit by which the selection of the desired direction of travel is made.

A phase shifting arrangement is connected between the secondary winding of the power transformer and the gating transformers in order to shift the phase angle of the gating signal applied to the power triacs with respect to the electrical power signals conveyed through the triacs. Such a phase shift may be obtained by inserting a capacitor in the line connecting the ungrounded end of the secondary of the power transformer to the gating transformers. The purpose of the phase shift arrangement is to achieve desired commutation of the power triacs in order to prevent undue distortion of the wave shape of the AC signal conveyed to the motor.

Energization of the gating transformers from the power transformer is determined by bidirectional gating switches, such as gating triacs. A gating triac is connected to the primary winding of each of the gating transformers. Gating of the gating triacs is achieved by an appropriate switching arrangement, which obtains a gating signal for the gating triacs from the secondary winding of the power transformer.

In the particular embodiment disclosed herein, the hospital bed has three separate types of adjustment. The first portion or section of the bed adjusts the angular position of the upper torso of the person in the bed and may be characterized as the head portion of the bed. A second portion or section is that part of the bed under the knees, which may be buckled upwardly to provide support for the knees if the legs are bent. This section may be termed the knee portion. Finally, the entire portion of the bed that is movable with respect to the stationary frame may be raised and lowered.

While any desired system employing a motor or motors could be utilized to drive the separate bed portions, in the embodiment discussed herein a separate motor has been utilized for each portion of the bed. For purposes of this discussion, these motors may be identified as the head motor, the knee motor and the bed motor. Each of these motors is provided with the two field windings for driving the associated bed portions in opposite directions. For ease or reference, all of the motions of the bed portions have been characterized as "up" or "down", even though the head and knee portions do not involve simple linear motion.

Each of the field windings has an associated power triac with its corresponding gating transformer. Each of the gating transformers has an associated triac, each of which is gated through a switch arrangement and a routing circuit. The switch arrangement employs patient activated momentary switches, each of which determines the portion of the bed to be driven and the direction of travel. The momentary switches convey a signal from the secondary winding of the power transformer, the signals from the power transformer being obtained through a pair of oppositely poled diodes having opposite ends commonly connected to a tap on the secondary winding of the power transformer.

A single gating line is provided for each of the motors, and the momentary switches apply the opposite polarity signals obtained through the oppositely poled diodes to this gating line, the polarity of the signals indicating the direction of travel for the bed portion driven by that motor. The routing circuit includes the gating lines, a lock-out switch located in each gating line to permit disconnection of patient control, and a pair of oppositely poled diodes to which each of the gating lines is connected. Each of the diodes is connected to a corresponding gating triac, so that the signals from the gating lines pass through one of the oppositely poled diodes to gate the proper gating triac and hence the proper power triac.

In addition to the patient operated momentary switches, an additional pair of momentary switches may be positioned at a location spaced from the patient selectors to permit selective energization of the bed motor. Thus, an attendant or nurse can raise or lower the bed without having to reach the patient selecting switches, which would normally be located on the side guards of the bed.

A continuous down function is provided by a latching circuit, so that upon energization of the bed motor in the down direction by either the patient or a nurse, the bed will continue its downward motion, even after release of the momentary switch. Limit switches are employed to deenergize the bed motor upon the bed reaching a predetermined maximum position in either the up or down direction. Automatic adjustment of the knee portion in response to adjustment of the head portion of the bed may be achieved by means of a contour circuit, which is operative only within a certain range of travel. The common of the head motor is connected to a power line or hot line from the AC power source to limit leakage currents, and a switching arrangement is utilized to disconnect this hot line except when the head motor is to be energized. A self-gating triac switch is utilized for this function.

With this arrangement a control circuit is provided for adjusting the positions of bed portions by utilizing a commonly available source of AC power both to drive the electric motors and to energize the selection functions. At the same time, these two portions of the control circuit are completely isolated from one another to minimize the risk of electrical shock to a patient. These functions are achieved with a relatively noncomplex, reliable and relatively inexpensive circuit.

These and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figure 2:
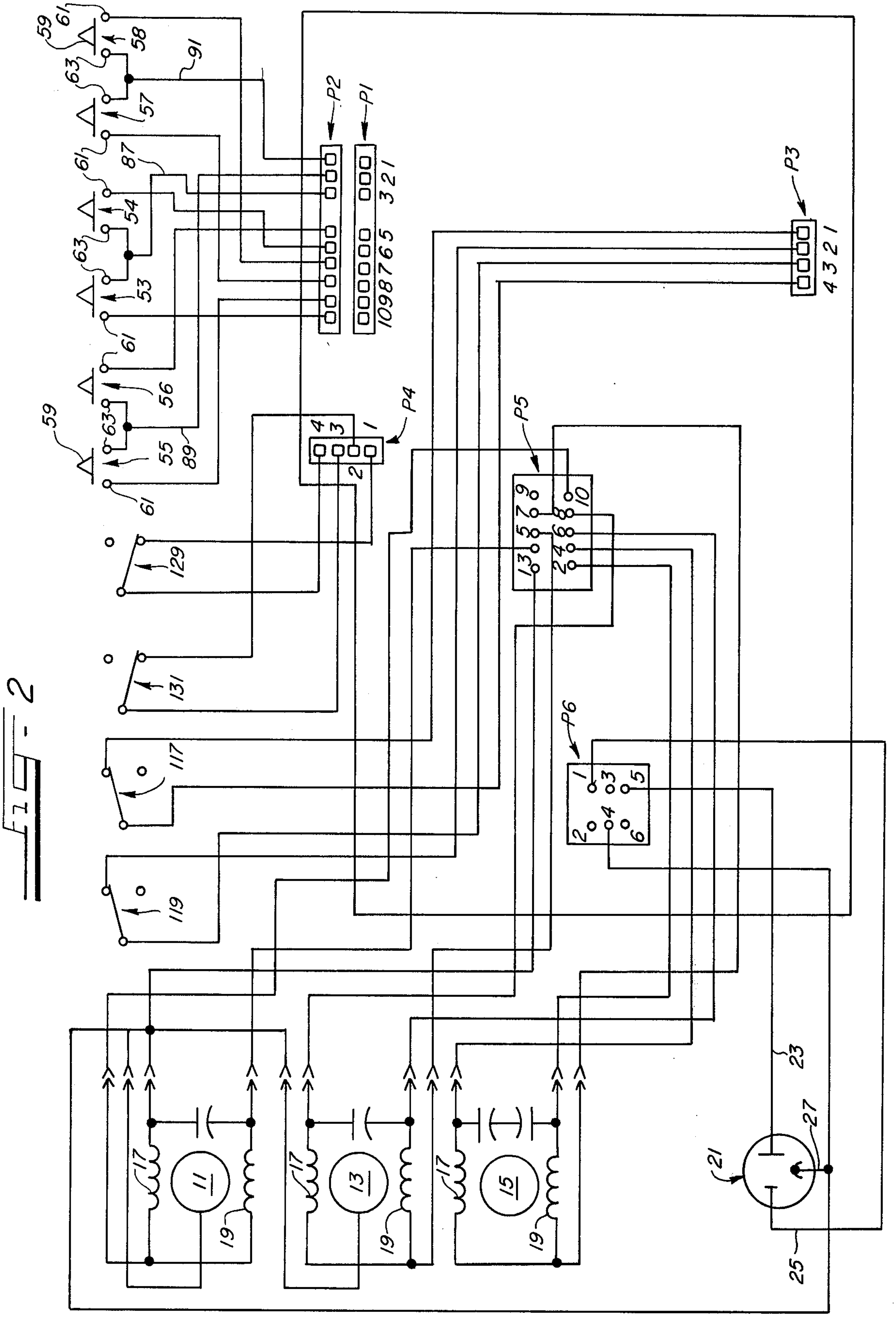
FIG. 2 is a schematic wiring diagram illustrating the circuit connections of the connectors in FIG. 1.

With reference first to FIG. 2, it may be seen that a head motor 11, a knee motor 13 and a bed motor 15 are provided to drive the head portion, knee portion and entire movable portion of the bed up and down. Each of the motors 11, 13 and 15 has a field winding 17 to cause the motor to drive the associated bed portion upwardly and another field winding 19 to cause the motor to drive the associated bed portion downwardly.

Figure 1:
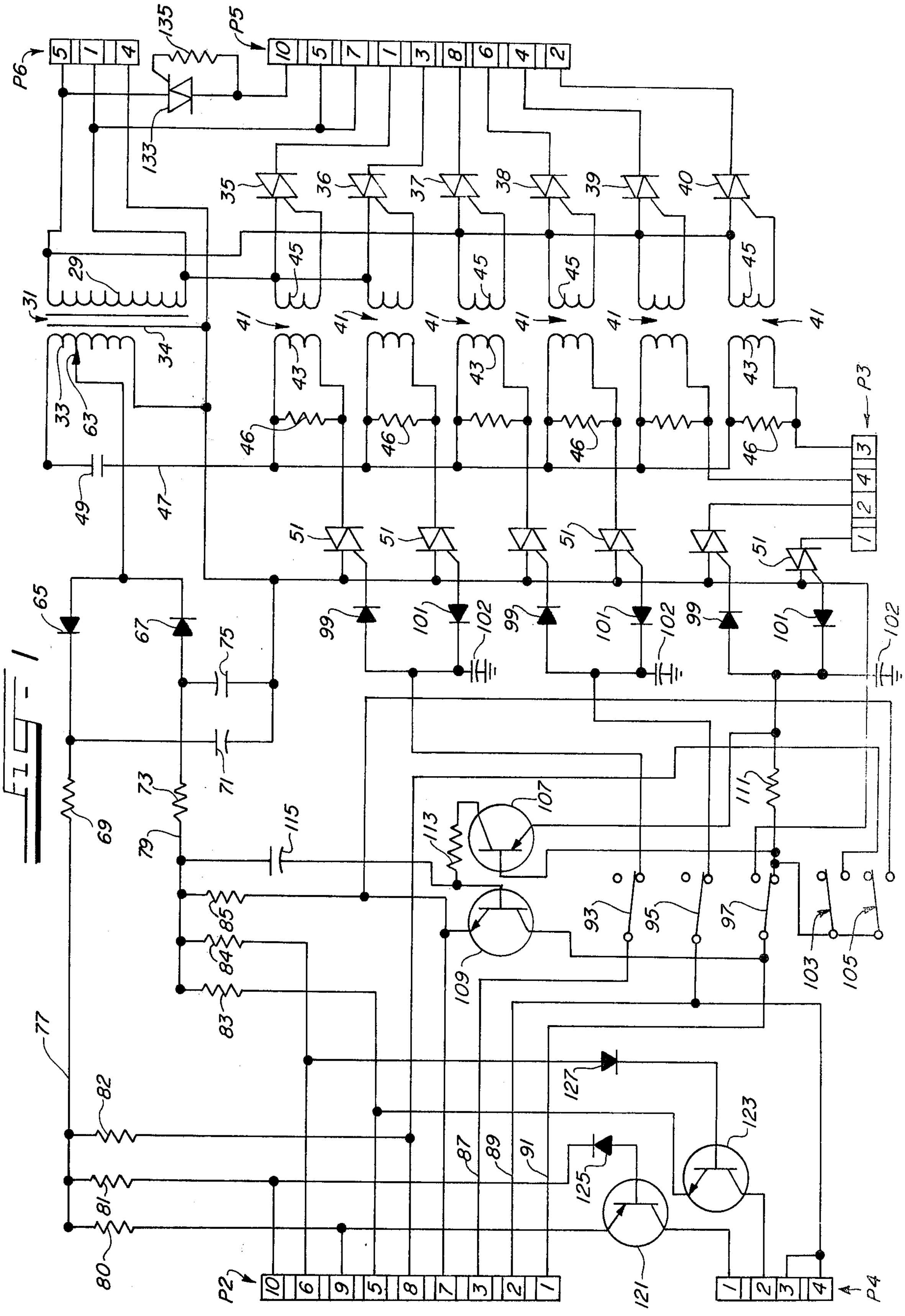
FIG. 1 is a schematic circuit diagram of a preferred embodiment of the control circuit of the present invention.

FIG. 2 also illustrates the external connections for the connectors P1–P6, for which the internal connections of the control circuit are illustrated in FIG. 1. It should be noted that while the connectors P1–P6 have the pin numbers shown in numerical sequence in FIG. 2, they are illustrated in different sequence in FIG. 1 to simplify the depiction of the circuit connections. Also, it should be noted that the connectors P1 and P2 have identical connections, since they relate to the patient's selection switches, a set of which is located on each of the side guards. Accordingly, while this description will be in terms of the connector P2, it should be recognized that the identical description is applicable to the connector P1.

A source of AC power is schematically represented by the plug 21, which may be located in a conventional wall socket to obtain 120 volt AC power. The hot side 23 of plug 21 is connected to pin 5 on connector P6, while the neutral side 25 is connected to pin 1 on connector P6. Also, a ground connection 27 from the plug 21 is made to pin 4 on connector P6. The electrical signal between pins 5 and 1 on connector P6 is applied to a primary winding 29 of a power transformer 31. A secondary winding 33 of power transformer 31 has one side thereof grounded to pin 4 on connector P6. The core 34 of transformer 31 is also grounded.

Each of the field windings 17 and 19 of head motor 11, knee motor 13 and bed motor 15 is connected to a bidirectional power switch, illustrated as triacs 35–40 in FIG. 1. The number of power triacs employed will depend, of course, upon the number of functions to be achieved, but as this preferred embodiment relates to a bed having three movable portions, each of which is positionable in two directions, a total of six power triacs are employed. From the pin connections in FIGS. 1 and 2, it may be seen that the field winding 17 of head motor 11 is connected to the second terminal of triac 35, while the field winding 19 thereof is connected to the second terminal of triac 36. Similarly, field winding 17 of knee motor 13 is connected to the second terminal of triac 37, while the field winding 19 thereof is connected to the second terminal of triac 38. Finally, the field winding 17 of bed motor 15 is connected to the second terminal of triac 39, while the field winding 19 thereof is connected to the second terminal of triac 40. The first terminals of triacs 35 and 36 are connected to the neutral side 25 of plug 21, while the first terminals of triacs 37-40 are connected to the hot side 23 of plug 21. Accordingly, when any of the power triacs 35–40 is gated into conduction, AC power will be conveyed to the associated field winding to energize that motor.

Gating of the power triacs 35–40 is achieved through the gating transformers 41. Each of the gating transformers 41 has a primary winding 43 and a secondary winding 45. Resistors 46 are located across primary windings 43 to provide a load in the gate circuits of power triacs 35–40 to prevent self gating or running away of the power triacs 35–40. As is readily apparent, the use of power transformer 31 and gating transformers 41 means that the power portion of the control circuit, which includes the primary 29 of power transformer 31 and the connections made thereto, is isolated from the selecting portion of the control circuit, which includes the connections to the secondary winding 33 of power transformer 31 and to the primary windings 43 of gating transformers 41.

Energization of the primary windings 43 of gating transformers 41 is achieved from the ungrounded side of secondary winding 33 of power transformer 31 through a signal carrying line 47. A phase shift of the signal carried by line 47 is achieved by means of capacitor 49. The purpose of phase shifting capacitor 49 is to vary the phase of the gating signals applied to power triacs 35–40 with respect to the AC power signals passed therethrough. This provides the desired commutation of power triacs 35–40 to yield an improved wave form for the power signals conveyed to motors 11, 13 and 15. The operation of the phase shifting capacitor is explained in greater detail in the co-pending application of Charles W. Cutler entitled "POWER TRANSFER UNIT WITH LOW VOLTAGE CONTROL ARRANGEMENT", filed on Nov. 24, 1975 and allocated Ser. No. 634,920, which is assigned to the same assignee as the present invention. The disclosure of that application is expressly included herein by reference.

Energization of the primary windings 43 of gating transformers 41 is determined by the bidirectional gating switches or gating triacs 51. Gating of a triac 51 causes the associated primary winding 43 to be connected across secondary winding 33 of power transformer 31 for energization thereof.

Selection of the desired direction of travel of a particular portion of the hospital bed is achieved by means of momentary switches 53–58. Activation of momentary switch 53 by an operator, such as a patient, will result in upward travel of the head portion, while activation of switch 54 will produce downward travel of the head portion. Similarly, activation of momentary switch 55 will produce upward travel of the knee portion, while switch 56 will produce downward travel thereof. Finally, activation of momentary switch 57 will produce upward travel of the entire movable bed portion, while activation of switch 58 will produce downward travel thereof.

Each of the momentary switches 53-58 includes a manually activatable bridging member 59 and a pair of stationary contacts 61 and 63. Of course, any other appropriate type of manually activatable, normally open, momentary switch arrangement could be utilized.

Each of the contacts 61 is supplied with a signal from the secondary winding 33 of power transformer 31. A tap 63 on secondary winding 33 is connected to a pair of oppositely poled diodes 65 and 67. The other side of diode 65 is connected to a resistor 69 and a capacitor 71, while the other side of diode 67 is connected to a resistor 73 and a capacitor 75. Resistors 69 and 73 are deposited metal film resistors with fail open guaranteed, in order to provide a current limiting function and also to provide further protection for the patient as a result of the guaranteed failopen feature. Capacitors 71 and 75 are connected to ground to provide a power supply filtering function. As a result of this arrangement, a positive selecting or gating signal is provided on line 77, while a negative selecting or gating signal is provided on line 79. The gating signal on line 77 is then conveyed to resistors 80–82, while the gating signal on line 79 is conveyed to resistors 83–85. Resistors 80-85 establish the gating current levels for gating triacs 51.

From FIGS. 1 and 2, it may be seen that stationary contact 61 of switch 53 is connected to the resistor 81, stationary contact 61 of switch 55 is connected to the resistor 80, and stationary contact 61 of switch 57 is connected to the resistor 82. Similarly, stationary contact 61 of switch 54 is connected to the resistor 84, stationary contact 61 of switch 56 is connected to the resistor 83, and stationary contact 61 of switch 58 is connected to the resistor 85. Also, it may be seen that the stationary contacts 63 of switches 53 and 54 are connected to a single gating line 87, stationary contacts 63 of momentary switches 55 and 56 are connected to a single gating line 89, and stationary contacts 63 of momentary switches 57 and 58 are connected to a single gating line 91. With this arrangement, activation of a switch 53, 55 or 57 will place a positive gating signal on gating line 87, 89 or 91, respectively. Similarly, activation of a momentary switch 54, 56 or 58 will result in the placing of a negative gating signal on gating line 87, 89 or 91, respectively. Further, if both the up and down switches for a particular bed portion are erroneously pushed simultaneously, the positive and negative gating signals will cancel each other, and the corresponding motor will not be energized.

Each of the gating lines 87, 89 and 91 includes a lock-out switch 93, 95 and 97, respectively. Lock-out switches 93, 95 and 97 are normally closed, but may be manually actuated to an open position, if, for some reason, it is desired to prevent the patient from having control over the positioning of a particular portion or portions of the bed. Each of the gating lines 87, 89, 91 is connected to a pair of oppositely poled diodes 99 and 101. The other sides of the oppositely poled diodes 99 and 101 are connected to associated gating triacs 51. Thus, it a positive gating signal appears on one of the gating lines 87, 89 and 91, the signal will pass through diode 99 to gate its associated gating triac 51. Similarly, if a negative gating signal appears on the gating lines it will pass through diode 101 to its associated gating triac.

In addition to the patient-operated, momentary selector switches for the bed motor 15, additional momentary switches 103 and 105 are provided at a position remote from the location of the patient selector switches. As the patient selector switches will be located on the side guards of the bed, the switches 103 and 105 may be located, for example, at the foot of the bed. This arrangement permits an attendant or nurse to raise or lower the bed without having to use the patient selector switches on the side guards. As may be seen, activation of momentary switch 103 will place a positive gating signal on gating line 91, while activation of switch 105 will place a negative gating signal on that line.

As it is frequently desired to take the bed to its lowermost position when actuated in the down direction (e.g., to permit changing of the bed sheets or to permit the patient to get out of the bed), a latching circuit has been provided to maintain the bed down travel even after momentary switch 105 has been released. This latching circuit includes transistors 107 and 109, resistors 111 and 113 and capacitor 115. Upon closure of momentary switch 105 or momentary switch 54, a negative gating signal will be connected to gating line 91 on the lock-out switch side of resistor 111. As the emitter of transistor 107 is essentially at ground potential, this will forward bias the emitter-base junction of transistor 107. Also, since the negative potential on the base of transistor 107 is less than the potential on line 79 as a result of the voltage drop across resistor 85, and since the full potential of line 79 is applied to the collector of transistor 107 through capacitor 115 and resistor 113, transistor 107 will be turned on to carry current, which will quickly charge the the relatively small capacitor 115, after which the current flow will cease. However, transistor 109 will remain turned off due to the fact that its emitter, base and collector are, after charging of capacitor 115, all at the same potential. Upon opening of a momentary switch 105 or 54, the potential on the collector of transistor 109 will tend toward ground potential and, as a result of the biasing current from transistor 107 that then flows, transistor 109 will turn on. The resultant current flow through transistor 109 will produce a voltage drop across resistor 111 to maintain transistor 107 in a conducting state. As a result of the current flow through transistor 109 and, to some extent, the current flow through transistor 107, diode 101 connected to gating line 91 will carry current flow through the gate-terminal "one" junction of the corresponding gating triac 51. This results in gating of that triac and maintaining energization of the bed motor.

If it is desired to discontinue the down travel of the bed, all that is necessary is to push one of the momentary switches 103 or 53. As may be seen, the positive gating signal that this applies to gating line 91 is also conveyed to the base of transistor 107 to strongly back-bias the base-emitter junction and turn of transistor 107. Transistor 109 is still forwardly biased, so that the capacitor 115 quickly discharges through the base-emitter junction of transistor 109. After capacitor 115 has discharged, the lack of a base current will also result in transistor 109 turning off. Thus, upon release of the momentary switch 103 or 53, the bed motor will be deenergized.

In order to limit the up and down motion of the bed under the control of the bed motor, mechanically-actuated, normally-closed limit switches 117 and 119 (FIG. 2) are employed. Consideration of the pin connections for connector P3 in FIGS. 1 and 2 shows that the connections from the gating triacs 51 to the associated gating transformers 41 run through the limit switches 117 and 119, so that is one of these switches is open, the bed motor field winding for that function will not be energized. It may be seen that the limit switch 117 will limit the down travel of the bed, while the limit switch 119 will limit the upward travel.

Another feature that may be utilized is to automatically adjust the knee portion of the bed in response to adjustment of the head portion of the bed, so that the patient can remain comfortable without having to independently adjust both portions. A contour circuit to achieve this function is shown in FIG. 1 and includes transistors 121 and 123, diodes 125 and 127, and normally-closed switches 129 and 131. From FIGS. 1 and 2, it may be seen that if momentary switch 53 is closed to raise the head portion of the bed, the voltage drop across resistor 81 will result in the forward biasing of the emitter-base junction of transistor 121. Since the collector of transistor 121 is essentially at ground potential, current flow will be initiated through transistor 121, switch 129, and gating line 89 to energize the knee motor to move the knee portion in an upward direction. Similarly, closure of momentary switch 54 to move the head portion downwardly will produce a current flow through transistor 123, switch 131 and gating line 89 to energize the knee motor for downward direction of the knee portion. Switches 129 and 131 are arranged to be mechanically opened if the movement of the portions is outside a certain predetermined range. Solely for purposes of illustration, it might be decided that it is not desirable to have the knee portion automatically contoured above an inclination of 15° (it has been found that this amount of inclination prevents the patient from sliding down in the bed as the head portion is raised). Thus, provision would be made for mechanically opening switch 129 upon the knee portion reaching an inclination of 15°. Similarly, it might be determined that if the head portion is above a certain inclination, an adjustment downwardly of the head portion should not produce an automatic adjustment of the knee portion downwardly. Therefore, if the head portion were above a predetermined inclination (e.g., 25°), switch 131 would be mechanically opened.

One other aspect of the circuit involves the fact that one of the motors, in this case head motor 11, has the hot side of plug 21 connected to the common thereof, in order to reduce leakage currents. As such a wiring arrangement increases the possibility of a dangerous electrical shock to the patient, since the motor 11 has the hot side of the line connected thereto even when the motor is not being energized, it is desirable to provide a power disconnect arrangement to disconnect the hot wire from motor 11 unless it is energized to drive the corresponding head portion of the bed. Such an arrangement is provided by the bidirectional solid state switch device or triac 133, with an impedance or resistor 135 connected between the gate and terminal "two" thereof. If either of the power triacs 35 or 36 is gated to close the energization circuit for motor 11, triac 133 will be gated through 135 to permit energization of the appropriate field winding.

While any appropriate circuit components may be utilized, the following listing indicates a particular set of circuit component values that have been found successful in a particular application of this control circuit:

1. Capacitor 49: 10 microfarads, 25 volts AC, nonpolar aluminum;
2. Capacitors 102: 220 microfarads, 25 volts;
3. Capacitors 71 and 75: 0.22 microfarad, 25 volts DC, electrolytic;
4. Diodes 99, 101, 125 and 127: 1N914;
5. Diodes 65 and 67: 1N4001;
6. Connectors P1 and P2: AMP, Incorporated Part Nos. 85830-3 and 85830-6;
7. Connectors P3 and P4: AMP, Incorporated Part No. 85830-4;
8. Connectors P5: AMP, Incorporated Part No. 1-380991-0;
9. Connector P6: AMP, Incorporated Part No. 1-380999-0;
10. Triacs 35–40 and 133: ECC Corporation Part No. Q4010;
11. Triacs 51: ECC Corporation Part No. L200E5;
12. Transistors 107 and 121: 2N3906;
13. Transistors 109 and 123: 2N3904;
14. Resistors 46: 1,000 ohms, 10%, ¼ watt;
15. Resistors 80–85: 1,800 ohms, 10%, ¼ watt;
16. Resistor 111: 270 ohms, 10%, ¼ watt;
17. Resistor 113: 10,000 ohms, 10%, ¼ watt;
18. Resistors 69, 73, and 135: 130 ohms, 5%, ½ watt, Corning Glass Type FP ½;
19. Transformer 31: Hill-Rom Company, Inc. Part No. 24608, Primary 120 volts RMS, Secondary 15 volts RMS at 75 milliamperes, tapped at 9 volts;
20. Transformer 41: Hill-Rom Company, Inc. Part No. 24609, Primary 1500 turns of no. 38 wire, Secondary 500 turns of no. 36 wire.

It should be understood that various modifications, changes and variations may be made in the arrangement, operation and details of construction of the elements disclosed herein without departing from the spirit and scope of this invention.

We claim:

1. A control circuit for a bed with a movable portion actuated by an electric motor, the control circuit having a selecting portion and a power portion and comprising:

a source of AC power;

a first field winding for the electric motor, energization of said first field winding causing the motor to raise the movable portion of the bed;

a second field winding for the electric motor, energization of said second field winding causing the motor to lower the movable portion of the bed;

a first bidirectional power switch to cause said first field winding to be selectively energized by said source of AC power;

a second bidirectional power switch to cause said second field winding to be selectively energized by said source of AC power;

a first gating transformer to provide an actuating signal for said first bidirectional switch while isolating the selecting portion from the power portion of the control circuit;

a second gating transformer to provide an actuating signal for said second bidirectional switch while isolating the selecting portion from the power portion of the control circuit;

a power transformer having primary and secondary windings, the secondary winding of said power transformer being grounded;

a first bidirectional gating switch to cause selective energization of said first gating transformer from the secondary winding of said power transformer;

a second bidirectional gating switch to cause selective energization of said second gating transformer from the secondary winding of said power transformer;

phase shifting means between the secondary winding of said power transformer and said gating transformers to produce actuating signals for said bidirectional power switches that properly commutate said bidirectional power switches; and switch means to selectively actuate said bidirectional gating switches from the secondary of said power transformer.

2. A control circuit as claimed in claim 1 wherein said bidirectional power switches and said bidirectional gating switches are triacs.

3. A control circuit as claimed in claim 1 wherein said phase shifting means comprises a capacitor connected in a line conveying signals from the secondary winding of said power transformer to said gating transformers.

4. A control circuit as claimed in claim 1 wherein:

activation of said switch means selectively connects one polarity signal to a gating line for conveyance to said first bidirectional gating switch and an opposite polarity signal for conveyance to said second bidirectional gating switch; and a pair of oppositely poled diodes convey the appropriate polarity signals on said gating line to said first and second bidirectional gating switches.

5. A control circuit as claimed in claim 1 and further comprising:

a latching circuit to cause the appropriate one of said field windings to continue to be energized after deactivation of said switch means; and mechanically activated limit switches to deenergize said motor upon the movable portion of the bed reaching a predetermined maximum displacement in each direction of travel.

6. A control circuit for a hospital bed with a head portion raised and lowered by an electric head motor, a knee portion raised and lowered by an electric knee motor, and the entire movable portion of the bed raised and lowered by an electric bed motor, the control circuit having a selecting portion and a power portion and comprising:

a source of AC power;

a pair of field windings for each of the head, knee and bed motors, a first field winding to cause the associated motor to raise the appropriate portion of the hospital bed and a second field winding to cause the associated motor to lower the appropriate portion of the hospital bed;

a plurality of bidirectional power switches with one of said bidirectional power switches connected to each of said field windings, said bidirectional power switches selectively conveying AC power to the associated field winding from said source;

a power transformer having a primary winding connected to said source and a secondary winding with one side thereof grounded;

a plurality of gating transformers, each of said gating transformers connected to actuate a corresponding bidirectional power switch from said secondary winding of said power transformer, said power transformer and said gating transformers isolating the selecting portion of the control circuit from the power portion thereof;

phase shifting means to adjust the phase angle of the signal applied to said gating transformers from said power transformer to produce desired actuation of said bidirectional power switches;

a plurality of bidirectional gating switches, each of said bidirectional gating switches arranged to selectively determine energization of a corresponding gating transformer;

switch means to permit selection of a desired direction of motion for a particular portion of the hospital bed, said switch means connected to the secondary winding of said power transformer; and routing means to convey the signal from said switch means to the appropriate one of said bidirectional gating switches.

7. A control circuit as claimed in claim 6 wherein said bidirectional power switches and said bidirectional gating switches are triacs.

8. A control circuit as claimed in claim 6 wherein said phase shifting means comprises a capacitor connected in a line conveying the signal from the ungrounded side of the secondary of said power transformer to said gating transformers.

9. A control circuit as claimed in claim 6 wherein said switch means comprises a plurality of patient actuated momentary switches to pass a signal from the secondary winding of said power transformer upon activation, the two momentary switches for controlling a particular portion of the bed both passing the respective signals to a single gating line for that portion of the bed.

10. A control circuit as claimed in claim 9 wherein said routing means comprises:

a normally closed lock-out switch located in the gating line for each portion of the bed; and a pair of oppositely poled diodes connected to convey the signal on the gating line to the appropriate bidirectional gating switch.

11. A control circuit as claimed in claim 6 and further comprising a contour circuit to automatically adjust the heighth of the knee portion of the hospital bed upon variation of the head portion of the hospital bed, said contour circuit being effective only within a limited range of movement of the head and knee portions of the hospital bed.

12. A control circuit as claimed in claim 6 and further comprising another pair of momentary switches spaced from the patient operated switches and activatable by an attendant to energize the bed motor.

13. A control circuit as claimed in claim 12 and further comprising a latching circuit to maintain energization of the bed motor in the down direction after initial closing of the proper momentary switch; and limit switches to deactivate the bed motor when the entire movable portion of the bed reached maximum desired up and down positions.

14. A control circuit as claimed in claim 6 and further comprising a switching device between the hot side of said source and the head motor to preclude application of power to the head motor when it is not energized.

15. A control circuit for a hospital bed with a head portion raised and lowered by an electric head motor, a knee portion raised and lowered by an electric knee motor, and the entire movable portion of the hospital bed raised and lowered by an electric bed motor, the control circuit having a selecting portion and a power portion and comprising:

a source of AC power;

a pair of field windings for each of the head, knee and bed motors, a first field winding to cause the associated motor to raise the appropriate portion of the hospital bed and a second field winding to cause the associated motor to lower the appropriate portion of the hospital bed;

six power triacs, each of said power triacs connected to selectively convey AC power from said source to an associated one of said field windings;

a power transformer having a primary winding connected to said source and a secondary winding with one side thereof grounded;

six gating transformers, each of said gating transformers having a primary winding and a secondary winding with the secondary windings adapted to gate an associated power triac while isolating the selecting portion of the control circuit from the power portion thereof;

a signal carrying line connecting the ungrounded end of the secondary winding of said power transformer to the primary windings of said gating transformers;

a phase shift capacitor located in said signal carrying line to provide a phase shift between the gating signal to said power triacs and the power conveyed to the motors in order to commutate said power triacs in a desired fashion;

six gating triacs, each of said gating triacs connected to the primary winding of an associated gating transformer and adapated to permit selective energization of the associated gating transformer primary winding;

a pair of oppositely poled diodes connected with opposite ends tied to a tap on the secondary winding of said power transformer to provide gating signals of opposite polarity;

six patient operated momentary switches, each of said momentary switches determining actuation of an associated one of the portions of the bed and the direction in which it is to travel;

a single gating line for each of the motors, a corresponding pair of said momentary switches connecting opposite polarity signals from said first pair of oppositely poled diodes to said gating line, the opposing polarities representing different directions of motion of the associated portion of the hospital bed;

three pairs of oppositely poled diodes, each diode connected to an associated gating triac and each pair of oppositely poled diodes having one of said gating lines connected thereto so that said diodes can determine gating of the appropriate gating triac;

a lock-out switch located in each of said gating lines in order to permit disconnection of the patient control over movement of any portion or portions of the hospital bed;

a supplemental pair of momentary switches to control energization of the bed motor at a location spaced from the patient controls;

a contour circuit to automatically produce energization of the knee motor upon energization of the head motor within certain predetermined limits of travel of the corresponding bed portions;

a latching circuit to cause the entire movable portion of the hospital bed to continue moving downward after release of the corresponding momentary switch; and a pair of limit switches to preclude energization of the bed motor upon the entire movable portion of the hospital bed reaching predetermined maximum up and down positions.

* * * * *